March 26, 1957  T. R. QUERMANN ET AL  2,786,357
GYRO PENDULUM ROTOR SPEED CONTROL
Filed April 24, 1953  2 Sheets-Sheet 1

INVENTORS
THOMAS R. QUERMANN
SANFORD M. WEINBERGER
BY
ATTORNEY

March 26, 1957 T. R. QUERMANN ET AL 2,786,357
GYRO PENDULUM ROTOR SPEED CONTROL
Filed April 24, 1953 2 Sheets-Sheet 2
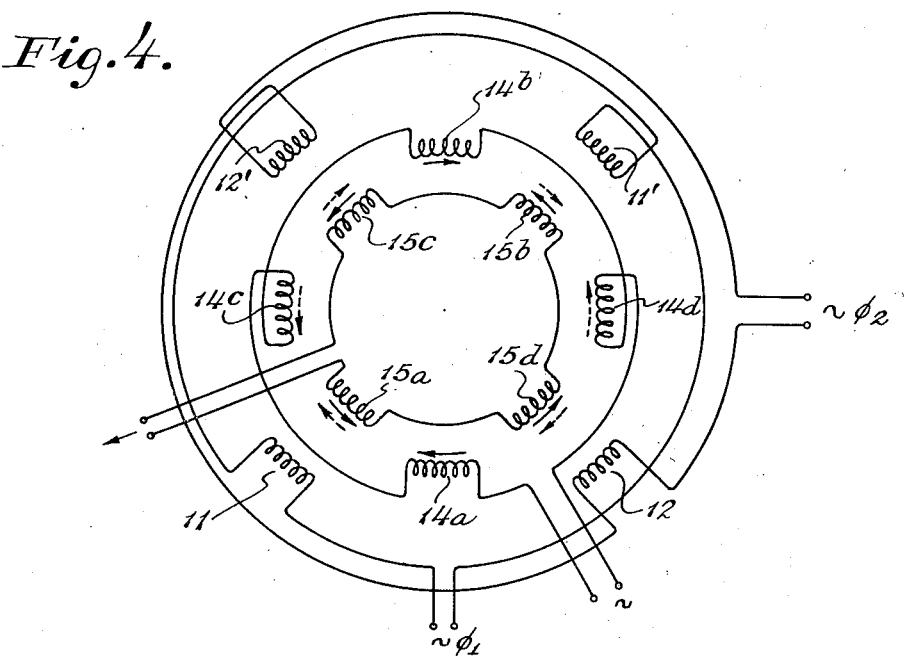
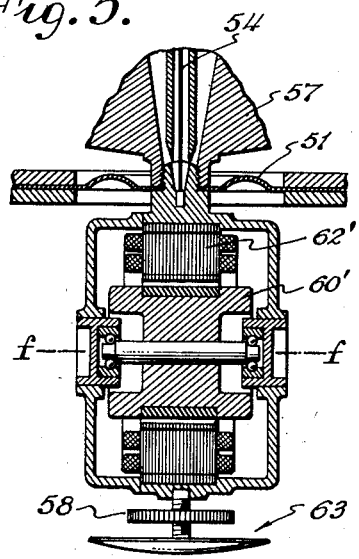
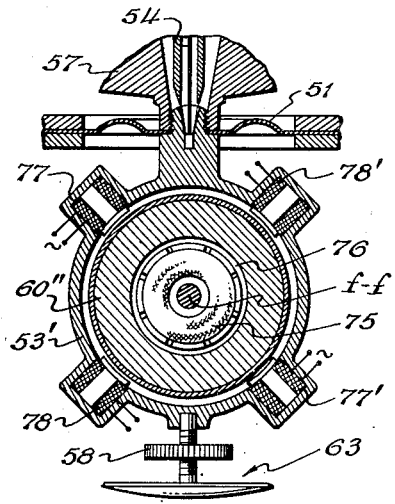
INVENTORS
THOMAS R. QUERMANN
SANFORD M. WEINBERGER
BY
R. V. Craddock
ATTORNEY

United States Patent Office 2,786,357
Patented Mar. 26, 1957

2,786,357

GYRO PENDULUM ROTOR SPEED CONTROL

Thomas R. Quermann, Bayside, and Sanford M. Weinberger, Jamaica, N. Y., assignors to Sperry Rand Corporation, a corporation of Delaware Application April 24, 1953, Serial No. 350,818

10 Claims. (Cl. 74—5.7)

The present invention relates to an instrument for determining the true gravitational vertical for a dirigible craft which instrument will be unaffected by accelerations of said craft. More particularly, the invention relates to means for compensating a pendulous instrument for accelerations of the craft upon which the instrument is mounted.

In U. S. Patent No. 2,595,268, issued to S. Kellogg, II and assigned to the assignee of the present invention, there is described and claimed a gyroscopic pendulum for providing a vertical reference for a dirigible craft. The gravitational factor or pendulous element forming a part of the instrument is subject to acceleration forces caused by turning of the craft, or, by changes of speed of the craft. In a gyroscopic pendulum, the effect of these forces are compensated by the precessional characteristics of the gyroscopic element of the pendulum. It is known that the centrifugal force acting on a pendulum, in making a coordinated turn of the craft, is proportional to the air speed of the craft, and therefore, for proper compensation, the precessional force of the gyro should be varied in accordance with air speed. This may be accomplished by changing the angular momentum of the gyro rotor as a function of air speed. Also, by adjusting the angular momentum of the gyro, in accordance with changes in air speed of the craft, linear accelerations resulting from such changes in air speed may be compensated.

It is, therefore, a primary object of our invention to provide a gyroscopic pendulum in which the angular momentum of the gyro rotor is controlled as a function of the air speed, preferably true air speed, of the craft on which it is mounted.

It is another object of our invention to provide an instrument of the above character which will compensate for the effects of very high accelerations encountered in present day high speed aircraft by providing a very precise, relatively high power, and highly efficient gyro rotor speed control.

It is a further object of our invention to provide a gyroscopic pendulum in which the angular momentum or speed of rotation of the gyro rotor is precisely adjusted in accordance with the horizontal component of the true air speed of the craft on which it is mounted to accurately and quickly compensate for the effects of both fore- and-aft and centripetal accelerations on the pendulous element or pendulous factor of the gyro pendulum.

Still another object of our invention is to provide a gyro rotor speed control system for a gyroscopic pendulum in which the gyro rotor is driven by a variable speed induction motor, its control winding being excited by a signal which varies in accordance with the algebraic sum of a signal proportional to the horizontal component of true air speed and a signal proportional to the actual speed of the gyro rotor.

It is still another object of our invention to provide a gyro rotor speed control system in which the gyro rotor is driven by a two phase, variable speed induction motor and in which the speed of rotation of the rotor is determined by a variable magnitude, constant frequency alternating current induction generator, both motor and generator forming an integral part of the gyro rotor and roto bearing frame.

A further object of the present invention resides in the provision of a gyro compensated pendulum in which a signal proportional to the horizontal component of true air speed and a signal proportional to the actual speed of rotation of the rotor are obtained, these two signals being combined or compared to provide a resultant signal which is used to control the speed of the rotor driving motor.

The above and other desirable features of novelty and advantage of the present invention will be described in the following specification and illustrated in the accompanying drawings, wherein, Fig. 1 is a schematic diagram of a preferred embodiment of our invention;

Fig. 4 is a schematic wiring diagram of the stator element of the motor-generator device of our invention;

Fig. 5 is a modification of a portion of the gyro compensated pendulum illustrated in Fig. 2; and Fig. 6 is a further modification of a portion of the gyro pendulum of Fig. 2.

Figure 1:
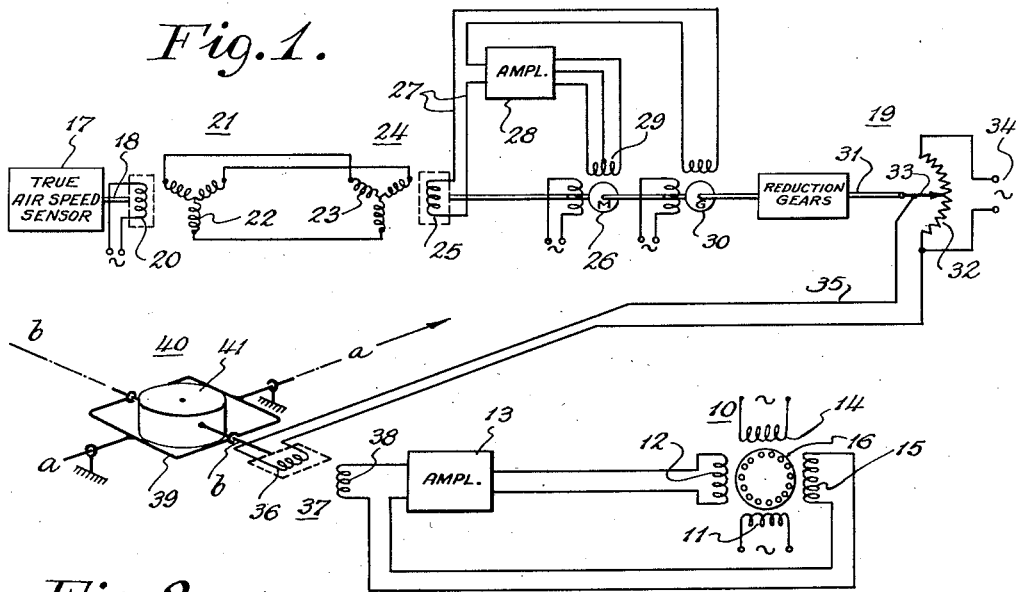

Referring now to Fig. 1 wherein there is shown a schematic diagram of the rotor speed control system of the present invention, the reference character 10 represents schematically the motor-generator unit which is used to drive the rotor of a gyro pendulum and to provide a signal proportional to the speed of rotation thereof. In the preferred embodiments of our invention, we have shown the gyro rotor drive motor as a two phase, variable speed induction motor, although, of course, other types of motors may be employed without departing from the scope of the invention. As shown, the rotor drive motor comprises a first winding 11 which is energized by one phase of a source of fixed or constant peak amplitude alternating current and a second or control winding 12 which is energized with a control or variable peak amplitude alternating current having a 90° phase relation to the fixed energization winding 11 and which may be the output of an amplifier 13. The generator which produces a signal proportional to the speed of rotation of the gyro rotor is an eddy-current type generator, and comprises a first winding 14 which is energized from a suitable source of fixed or constant peak amplitude alternating current and a second or pickup winding 15 which has induced therein by the currents generated within the squirrel cage 16 of the gyro rotor, an alternating current signal at line frequency, the peak magnitude of which is proportional to the rotational speed of the rotor. The details of the construction of the motor-generator will be hereinafter more fully described.

A true air speed sensor 17 is provided with an output shaft 18, the displacement of which is proportional to the true air speed of the aircraft. The term "true air speed" may be defined as the speed of the craft relative to the air mass in which it is flying and may be accurately determined by measuring the ratio of impact air pressure to static air pressure or density. Although the invention is not limited to the use of true air speed, this measure of air speed is preferable for accurate acceleration compensation of the gyroscopic pendulum. The position of shaft 18 may be used to drive an air speed signal generator 19 directly or, as shown, the signal generator 19 may be driven remotely, through a suitable positional servo system which maty be termed an air speed follow-up system. The reason that the air speed follow-up system is employed is because the air speed sensor supplies signals to other equipment on the aircraft and therefore it is not possible for the sensor to supply enough power directly. Furthermore, the output signal from some air speed sensors may be sinusoidal and therefore a follow-up system should be employed in order to obtain a signal which varies linearly with the air speed of the craft. In the air speed follow-up system, the output shaft 18 of the true air speed sensor positions the rotor 20 of a synchro transmitter 21, the stator 22 of which may be connected to the stator 23 of a remotely located control transformer 24, the rotor 25 of which is positioned through a servomotor 26. If an error exists between the position of the air speed sensor output shaft 18 and the position of the motor 26, an error signal will be generated in the rotor winding 25 of control transformer 24. This signal, appearing at leads 27, is applied to an amplifier 28, the output of which is applied to the control windings 29 of motor 26. In order that both the rate of rotation and the final displacement of the motor 26 be controlled accurately, i. e., without overshooting or hunting a suitable rate generator 30 is provided, the output of which is supplied in bucking relation to the signal appearing on leads 27. Thus, the output shaft 31 of motor 26 is positioned accurately in accordance with the true air speed of the aircraft.

The signal generator 19 is shown as a potentiometer having a winding 32 and a wiper 33, the winding 32 being supplied with an alternating current voltage from a suitable source 34. The output of this air speed signal generating means appearing across leads 35 is applied to the input winding or rotor winding 36 of a cosine resolver 37, the output winding 38 of which is applied to the rotor motor control amplifier 13. The case of the resolver 37 which supports the stator winding 38 is supported on the gimbal 39 of a vertical gyro 40, the resolver rotor 36 being positioned by the vertical gyro rotor case 41. The vertical gyro 40 is so gimballed in the aircraft structure that its gimbal axis $a$—$a$ is fore-and-aft of the aircraft (see arrow) and the rotor bearing case axis $b$—$b$ is normally athwartship of the craft. Thus, upon pitching of the aircraft up or down the gyro rotor case 41 holds the rotor 36 of the resolver 37 in a fixed position, while the stator 38 thereof rotates with the craft in pitch, thus generating in the stator windings 38 a signal which is proportional to the air speed times the cosine of the pitch angle, i. e., proportional to the horizontal component of air speed. Thus, the input of the amplifier 13 is proportional to the algebraic sum of a signal proportional to the horizontal component of true air speed and a signal proportional to the actual speed of the rotor of the gyro pendulum as determined by the output of the generator winding 15.

Figure 2:
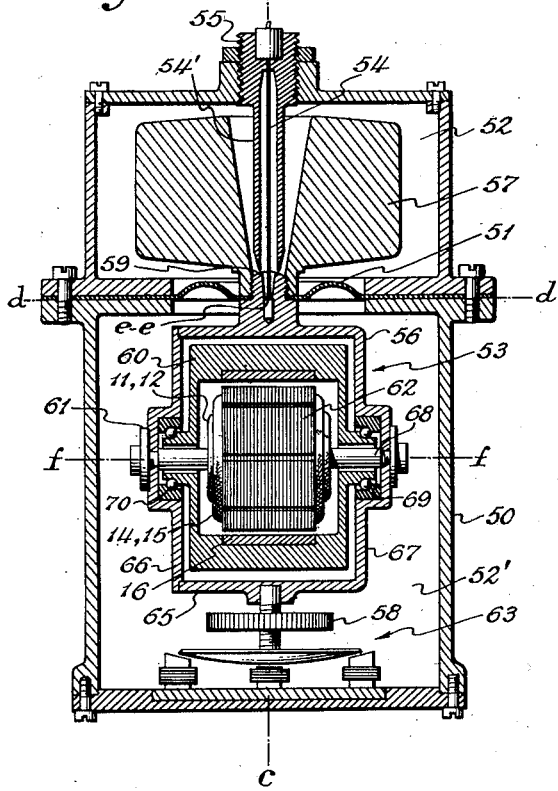
Fig. 2 is a vertical, athwartship sectional view of a preferred form of a gyro compensated pendulum embodying the features of our invention.

The gyro pendulum illustrated in Fig. 2 of the drawings is of quite a different form than that shown in the above-mentioned Kellogg patent and is described in more detail in another copending application Serial No. 117,631, in the names of Barkalow and Kellogg, filed September 24, 1949, now Patent No. 2,685,207, and assigned to the assignee of the present invention. In this application there is shown and described a gyro compensated pendulum which is mounted directly on a stable element and which slaves the stable element to gravitational vertical. The gyro pendulum described in the present case is of this latter type and is an improvement thereover. Generally the gyro pendulum comprises a housing 50 which is divided into two compartments or chambers 52 and 52′ by means of a diaphragm member 51 secured at its outer periphery to the walls of the casing 50. In the lower compartment 52′ there is a gyro 53 which is suspended by means of a suspension wire 54 having its upper end secured to the top of the casing 50 by means of a suitable adjustable mounting 55 and its lower end secured in the top of the rotor bearing frame 56 of gyro 53. A rigid tubular stop member 54′ secured at the top of the housing extends downwardly and parallel to the wire 54 and terminates just above the spherical portion 59 of the rotor case. As can be seen from the drawing, the center of the diaphragm is secured to the rotor bearing frame 56 at the same point as the lower end of the suspension wire 54. Thus, the suspension wire 54 and stop 54′ supports and simultaneously resists any movement of gyro 53 along the vertical axis $c$—$c$ while the diaphragm 51 supports or resists lateral movement of the gyro along axis $d$—$d$ and axis $e$—$e$. In other words, the diaphragm, being mounted in a plane perpendicular to the suspension wire, will permit only angular motion about the point of suspension, similar to that allowed in a gimballing system such as shown in the above-mentioned Kellogg patent. However, the important difference between a gimbal suspension and the present wire-diahpragm suspension is that the latter eliminates gimbal bearings and their attended undesirable friction. Also secured to the gyro 53 at the point of suspension thereof and extending upwardly into the upper chamber 52 is a counterweight or mass 57, the counterweight being of exactly the same weight as the gyro 53. Thus, the gyro-counterweight combination is in neutral balance about the axis $d$—$d$ and $e$—$e$. In order to make the combination slightly pendulous, a small weight or mass 58 is vertically adjustably secured to the gyro case 53.

The gyro 53 comprises the rotor bearing frame 56 which is in the form of a closed housing in which the rotor 60 is supported on suitable bearings 61 for spinning about a normally athwartship axis $f$—$f$ which parallels the suspension axis $d$—$d$. Also secured to the rotor bearing frame is an inductive stator member 62 having contiguously wound thereon the rotor driving windings 11 and 12 and the generator windings 14 and 15 (see also Fig. 3). On the inner peripheral surface of rotor 60 there is provided a suitable rotor core portion 16 which may be in the form of conductive rods, shorted at their ends, as in the case of the squirrel cage of an induction motor.

In order to appreciate the requirements for the accurate control of the gyro rotor speed, a general discussion of the operation of a gyro-compensated pendulum will be presented.

There are several forces which could cause the average position of the gyro pendulum to depart from the true gravitational vertical. In general, any acceleration changes not oriented vertically will cause displacement of the pendulum, and such accelerations which may be encountered in normal flight include centrifugal accelerations during turns and fore-and-aft accelerations due to changes in the air speed of the craft.

During a turn, a torque is produced on the gyro due to centripetal forces acting on the pendulous weight 58. This torque will appear as a precession force on the gyro element which, if the gyro were free to precess, would do so about the vertical axis $c$—$c$. However, the direction of rotation of the gyro is chosen such that the predicted azimuthal precession is in the same direction as the turning of the craft, and if the angular velocity of the rate gyro is made proportional to the true air speed of the aircraft, the torque produced for any turn at any air speed can be made to have the effect of causing a precession of the gyro at a rate equal to that of the aircraft's turning motion. Therefore, during such precession, even though the pendulum gyro lacks a degree of freedom, i. e., its ability to rotate about the suspension point in the plane of the diaphragm, no reaction forces between the gyro and casing would be present to displace the pendulous reference during turns. This is true because the case 50 of the gyro pendulum turns with the aircraft at the same rate that the gyro itself is precessed by the centrifugal force acting on the pendulous mass 58.

According to our invention, during fore-and-aft accelerations such as may be encountered during take-off and landing, or during any changes of speed of the aircraft, the angular velocity of the gyro rotor should be changed. This change in the angular velocity or angular momentum of the gyro rotor must be accomplished precisely at the same time and at the same rate as the craft speed changes. With precise control over the angular velocity of the gyro rotor afforded by the present invention, the effect of very rapid longitudinal accelerations of the craft on the gyro pendulum may be compensated. When the angular velocity of the gyro rotor is changed, a torque in one direction or the other must be applied to the gyro rotor to slow it down or speed it up, as the case may be. However, an equal and opposite reaction torque will appear on the gyro stator 62 which is secured to the rotor bearing frame or gyro housing 56. Such a torque would cause fore or aft displacement of the pendulous case about the athwartship axis d—d, but these torques can be made equal and opposite to the torques produced by the fore-and-aft accelerations acting on the pendulous mass 58 and therefore no net torque will result and the pendulum will not move. In the particular embodiment of the invention illustrated, the direction of rotation of the rotor must be such that the angular momentum vector extends toward the left side of the aircraft looking forward. Signals proportional to deviations of the case 50 from the vertical may be generated by a suitable pick-off device illustrated schematically at 63. Thus, it can be seen that for straight or curved flight, regardless of rough air or other gust disturbances the average position of the pendulum will always remain vertical.

In the embodiment of our invention illustrated in Fig. 2, the gyro unit 53 comprises a rotor bearing frame 56 which is in the form a cylindrical housing having a generally cylindrical outer wall 65 and two side or end walls 66 and 67. Supported between the side walls 66 and 67 is a strut 68 which extends along the axis of the cylindrical housing 65 and is coincident with the spin axis of the rotor bearing frame 56. The strut 68 serves to support the stator member 62 which has contiguously wound thereon the rotor driving windings 11 and 12 and the generator windings 14 and 15, to be hereinafter more fully described. The gyro rotor 60 is supported for rotation about the spin axis f—f by means of suitable ball bearings 69 and 70. Embedded in the inner peripheral surface of the rotor 60 and forming an integral part thereof is a rotor core portion 16. This rotor core portion forms the squirrel cage of a two phase, two pole induction motor for driving the gyro rotor 60. As is clearly illustrated in Figs. 2 and 3, the stator core element 62 and the core element 16 are concentrically arranged one within the other and have complementary adjacent cylindrical surfaces which define an airgap therebetween. Although the squirrel cage is shown herein as comprising a plurality of conductive slugs shorted at their ends, it will be understood that these may be omitted if the rotor itself has proper electrical characteristics, i. e. the rotor may be of iron having axially extending ridges which form suitable current conductive paths therein.

As stated above, the means for generating a signal proportional to the rotational velocity of the gyro rotor comprises an eddy-current type generator. An example of this general type of generator is described in detail in Riggs U. S. Patent 2,206,920, dated July 9, 1940. Such a generator comprises a stator having wound thereon an excitation winding and a pickup winding, the latter being arranged on the stator in space quadrature with the excitation winding, a core element forming a magnetic gap with the stator, and a rotating, non-magnetic cup mounted for rotation in the gap. As the cup is rotated, currents are generated therein which react with the magnetic field or flux generated by the excitation windings to thereby induce a current in the pickup winding. The current thus induced in the pickup winding is proportional to the speed of rotation of the cup. The output signal is an alternating current having a peak amplitude proportional to the cup speed and a frequency which is the same as that of the excitation alternating current.

Figure 3:
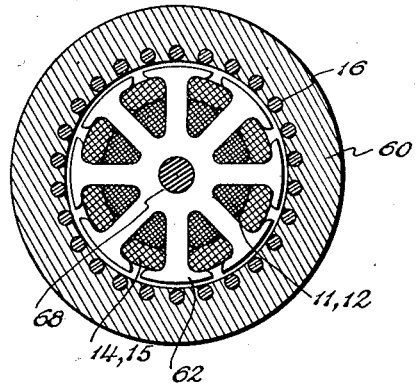
Fig. 3 is a cross sectional view of the gyro unit of Fig. 2 showing the contiguous motor-generator windings on the stator element, and the inductive core element on the gyro rotor.

That portion of our gyro rotor structure that forms a speed voltage generator constitutes a generator of the same general character as that above pointed out and operates on the same principles. However, there are important and distinct differences. In the generator of our invention, the magnetic core element and the current conducting element are combined as a part of the gyro rotor. In other words, the current conducting element of the generator is the squirrel cage of the rotor driving motor while the magnetic core of the generator is the rotor core of the motor. A preferred embodiment of the motor-generator unit of our invention is shown in Figs. 2 and 3. As shown, the stator core element 62 carries two sets of windings; one set comprises the fixed and control energization windings 11 and 12 and are so wound thereon as to provide a two pole, two phase induction motor; and the other set comprises the energization and output windings 14 and 15 respectively and are so wound thereon as to provide a four pole, single phase generator, the rotor core portion 16 or squirrel cage serving as the rotating armature for both the motor and the generator.

According to the preferred embodiment of our invention shown in Figs. 2 and 3, the stator core element 62 comprises a laminated core structure provided with a plurality of slots into which are placed the generator windings 14, 15 and also the motor windings 11, 12. The motor windings are shown as lying in the inner portion of the slots and the generator windings in the outer portion thereof. This arrangement may, of course, be reversed.

Different stator configurations could also be employed without departing from teachings of the present invention. For example, the generator windings 14, 15 and the motor windings 11, 12 may be wound in separate slots on the same stator core structure. In other words, there may be a group of slots for accommodating the motor windings and a separate group of slots for accommodating the generator windings.

In operation, the two phase motor windings 11, 12 set up a rotating flux in the airgap between the stator 62 and the rotor core 16 inducing currents in the latter which interact with the rotating flux produced by the stator windings thus producing a torque for driving the gyro rotor 60. The single phase generator excitation winding 14 sets up its own flux in the gap and likewise induces its own currents in the rotor core or squirrel cage 16. From one point of view, the spinning rotor may be said to warp or bend the magnetic field produced by the generator excitation winding to produce coupling with the pickup winding and the degree of coupling increases with increases in the speed of rotation of the rotor. From another point of view, the motion of the rotor conductors in the magnetic flux produced by the excitation winding 14 produces a voltage therein which is inductively conveyed from the rotor to the pickup winding 15 and is proportional to the speed of rotation of the rotor. Thus a signal proportional to rotor speed is available for rotor speed control purposes.

In Fig. 4, there is shown a schematic diagram of the motor-generator device of our invention. This schematic diagram can be used to describe one theory of operation of the device. As shown, the gyro motor comprises a two phase, two pole motor having a pair of excitation windings 11, 11′ excited from one phase of a suitable alternating current, and the windings 12, 12′ excited from another phase of alternating current 90° in phase quadrature with the first phase. Also, there is shown the generator excitation windings 14a, 14b, 14c and 14d, these windings being connected in series and being excited with a single phase of alternating current. The generator pickup windings are shown at 15a, 15b, 15c and 15d, which are also connected in series, and provide an output signal proportional to the speed of rotation of the gyro rotor. In order that there will be zero net voltage produced across the output terminals of the generator pickup windings induced thereby through flux linkage between the other windings of the device, the number of poles of the generator must be different than the number of poles of the motor. In the motor-generator device described herein, there are two motor poles and four generator poles. Other ratios of motor poles to generator poles may, of course, be suitable. For example, there may be four motor poles and eight generator poles, or eight motor poles and sixteen generator poles. Likewise, the number of motor poles may exceed the number of generator poles, as, for example, there may be eight motor poles and four generator poles, etc.

As shown in the schematic illustration of the motor-generator device, the currents flowing in the generator excitation windings 14a, 14b, 14c and 14d at any one instant of time may be indicated by the solid and dashed arrows adjacent these respective windings. The generator pickup windings 15a, 15b, 15c and 15d lie in a 45° space relation to the excitation windings, and in a zero degree space relation with respect to the motor excitation windings 11, 11' and 12, 12'. From one point of view, under a non-rotating condition of the rotor, the flux produced by the generator excitation windings 14b and 14c will induce equal and opposite currents in the generator pickup winding 15c through the flux linkage therebetween. Likewise, in a similar manner, it can be seen that equal and opposite currents will be induced in each of the generator pickup windings from the generator excitation windings, so that the net voltage appearing across the output terminals of the generator pickup windings will be zero. Assuming that the angular arrangement of the motor excitation windings 11, 11' and 12, 12' and the generator pickup windings 15a, 15b, 15c and 15d are as illustrated in Fig. 4, it can be seen that here again the currents induced in the generator pickup windings through flux linkage with the motor windings will be zero, i. e., the net current in the generator pickup windings and hence the net voltage appearing across the output terminals of these windings will be zero.

As pointed out above, under a non-rotating condition of the gyro rotor, the net voltage output across the generator pickup terminals is zero. If, now, the gyro is rotated by the drive motor, the currents induced in the generator pickup windings through flux linkage with the generator excitation windings will no longer bear a symmetrical relation to one another, i. e., the currents induced in one set of pickup windings will increase and in the other set will decrease, depending upon the direction of rotation of the rotor, to thereby produce a net current in the pickup windings. This net voltage across the output terminals of the pickup windings will be proportional to the speed of rotation of the rotor.

In Fig. 5, there is shown a modification of the gyro unit illustrated in Fig. 2. However, in this modification the stator 62' is external of the rotor 60'. The advantage of this configuration resides in the fact that the stator will be larger and consequently will be easier to wind. However, such an arrangement, while being very satisfactory from a motor design standpoint, may not be desirable from a gyroscopic standpoint. In other words, since the mass of the rotor 60' is closer to the axis of rotation f—f, the total angular momentum of the gyro will be smaller than that for the configuration shown in Fig. 2, where the mass of rotor portion 60 lies outside of the stator winding 62.

In Fig. 6, there is shown a further modification of the gyro unit illustrated in Fig. 2 of the drawings. Here the gyro rotor 60'' is shown as being supported for spinning about a spin axis f—f by a driving motor comprising a stator element 75 and a squirrel cage rotor element 76 which again is an integral part of the gyro rotor 60'. The motor may be of the same type used in the embodiment of Fig. 2, i. e., a two phase, two pole induction motor. However, in this modification the generator windings are separate from the motor windings. The generator excitation windings 77, 77' and the generator pickup windings 78, 78' are mounted on the periphery of the cylindrical rotor case 53' and are arranged in 90° space relation. Of course, only one of the excitation and pickup windings is essential. These coils are supported adjacent the outer peripheral surface of the gyro rotor 60' so that the magnetic fields produced by the excitation windings 77, 77' are intercepted by the rotor surface. If the material used for the rotor 60' has suitable electrical characteristics, i. e., is of a conductive, non-magnetic nature, the eddy currents generated therein by the energization windings 77 will induce in the pickup winding 78 a voltage proportional to the speed of rotation of the rotor. If, however, the rotor does not possess the desired electrical characteristics, the outer peripheral surface thereof may be plated with a conductive, non-magnetic material such as, for example, copper. In other words, the gyro rotor becomes an integral part of an eddy current, drag-cup generator or dynamic transformer, the output of which is proportional to the angular velocity of the gyro rotor. The windings 77 and 78, instead of being grouped in buttons as illustrated, may, of course, be distributed around the rotor case peripherally of the outer surface of the rotor.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for determining the rotational velocity of a gyroscope rotor comprising, a rotor having a non-magnetic, conductive surface portion extending substantially continuously therearound, a rotor bearing frame supporting said rotor for rotation about its spin axis, driving means supported by said frame for spinning said rotor, signal generating means supported by said frame for producing a signal proportional to the rotational velocity of said rotor including input windings excited from a source of alternating current supply and output windings supported on said frame adjacent said conductive rotor core portion and arranged in relatively angularly spaced relation thereon such that at zero rate of rotation of said rotor no signal current is induced in said output windings but upon rotation of said rotor a signal current will be generated in said output winding through eddy currents induced in said conductive rotor portion by the supply current in said input windings proportional to the rotational speed of said rotor.

2. In a gyro compensated pendulum for navigable craft, a pendulum supported for angular movement about normally horizontal craft axes, a gyro rotor having a conductive rotor portion supported on said pendulum, driving means having a stator portion also supported by said pendulum for spinning said rotor, and means for controlling the speed of rotation of said rotor as a function of the air speed of said craft comprising, means for generating a signal proportional to the air speed of said craft, means for generating a signal proportional to the speed of rotation of said rotor, said last mentioned means including at least one pair of windings supported on said pendulum and adapted to be inductively coupled by said conductive rotor portion, one of said windings being excited from a source of A. C. supply and the other of said windings being arranged in relatively angularly spaced relation to the one winding such that at zero rate of rotation of said rotor no signal current is induced in said other winding but upon rotation of said rotor an A. C. signal proportional to the speed of rotation thereof will be induced therein, means for comparing said air speed signal and said rotor speed signal, and means for supplying the resultant signal to said rotor driving means.

3. A device for determining the rotational velocity of a gyroscopic rotor comprising, a rotor element including a conductive core portion, a rotor bearing frame for rotationally supporting said rotor for spinning about an axis, a stator element carried by said frame and including a core portion concentrically arranged about said axis, the core portions of said stator and rotor elements having complementary cylindrical adjacent surfaces forming an air gap therebetween, a pair of space quadrature motor windings wound on said stator element and excited with polyphase alternating current for rotating said rotor element at a speed proportional to the excitation potential, generator windings wound on said stator element contiguously with said motor windings, said generator windings including a first winding excited with an alternating current and a second winding wound in angularly spaced relation with said first winding whereby at zero rate of rotation of said rotor no currents will be induced in said second winding but upon rotation thereof an alternating current will be induced therein proportional to the speed of rotation of said rotor by currents induced within said rotating rotor core portion.

4. A system for controlling the rotational velocity of a gyro rotor comprising a rotor having a conductive core portion, a rotor bearing frame for supporting said rotor for spinning about an axis, a stator element including a core portion supported by said frame, said stator and rotor elements having complementary cylindrical adjacent surfaces defining an air gap therebetween, a pair of motor windings wound on said stator core portion, one of said motor pair being excited with a fixed alternating current and the other with a variable alternating current whereby the rotating magnetic field generated thereby will drive said rotor through currents induced therein at a speed proportional to the magnitude of said variable alternating current, means for generating a signal proportional to the desired angular velocity of said rotor, means for generating a signal proportional to the actual angular velocity of said rotor, said last-mentioned means including a pair of input and output windings, said input winding being excited with a fixed alternating current and said output winding being arranged in relatively angularly spaced relation to said input winding such that at zero rate of rotation of said rotor no signal currents will be induced in said output winding, but upon rotation of said rotor signal currents will be induced therein proportional to the actual rotational velocity of said rotor by currents in said rotating rotor core portion, means for combining said desired rotor speed signal and said actual rotor speed signal, and means for supplying the resultant signal to the variable alternating current winding of said motor.

5. In a gyro compensated pendulum for navigable craft, a pendulum supported for angular movement about normally horizontal craft axes, a gyro rotor having a conductive core portion thereon and rotationally supported by said pendulum, driving means for said rotor including a stator portion supported by said pendulum and having a motor field winding and a motor control winding wound thereon, means for controlling the speed of said rotor as a function of the air speed of said craft comprising means for generating a signal proportional to the air speed of said craft, means for generating a signal proportional to the speed of rotation of said rotor, said last mentioned means including a pair of relatively angularly spaced generator windings wound on said stator portion in a common space for both of said motor and generator windings, one of said generator windings being energized with a fixed alternating current and the other generator winding having induced therein by currents generated in said rotor core portion by said energization winding a variable alternating current proportional to the speed of rotation of said rotor, means for comparing said first and second signals, and means for supplying the resultant signal to the control winding of said rotor driving means.

6. In a system for determing the rotational velocity of a gyroscope rotor comprising, a rotor member having a conductive outer peripheral surface, a rotor bearing frame for rotationally supporting said rotor, driving means supported by said frame for spinning said rotor, and signal generating means for producing a signal proportional to the angular velocity of said rotor, said signal generating means comprising a plurality of pairs of pole members supported on said frame and having their electrical axes arranged in quadrature relation, input windings on alternate ones of said pairs of poles energized from a source of fixed alternating current and output windings on the other ones of said pairs of pole members, said plurality of poles being positioned adjacent said conductive peripheral surface of said rotor whereby upon rotation thereof said rotor will inductively couple the electric fields of said alternate ones of said pole members to the other ones of said pole members to thereby induce in the latter an alternating current voltage proportional to the rotational speed of said rotor.

7. A system for controlling the angular velocity of a gyroscope rotor comprising, a rotor having a conductive outer peripheral surface, a rotor bearing frame for rotationally supporting said rotor, driving means supported by said frame for spinning said rotor, means for generating a first signal proportional to the desired angular velocity of said rotor, and means for generating a second signal proportional to the actual angular velocity of said rotor, said second signal generating means comprising input and output core and winding members supported on said frame adjacent the outer peripheral surface of said rotor and positioned in quadrature relation to one another, said input member being supplied with a fixed alternating current and said output member being inductively energized thereby through said conductive nonmagnetic rotor surface whereby said second signal is generated in said output winding proportional to the speed of rotation of said rotor, means for comparing said first and second signals, and means for supplying the resultant signal to said rotor driving means.

8. In a gyro compensated pendulum for navigable craft, a pendulum supported for angular movement about normally horizontal craft axes, a gyro rotor carried by said pendulum, driving means supported by said pendulum for spinning said rotor, and means for controlling the speed of said rotor as a function of the air speed of said craft comprising, means for generating a signal proportional to the air speed of said craft, means for generating a signal proportional to the speed of rotation of said rotor, said last mentioned means including a pair of coils supported on said pendulum adjacent a peripheral portion of said rotor and inductively coupled thereby, one of said coils being excited from a source of alternating current supply and the other of said coils having induced therein by the inductive coupling of said gyro rotor an alternating current proportional to the speed of rotation thereof, means for comparing said air speed signal and said rotor speed signal, and means for supplying the resultant signal to said rotor driving means.

9. A gyroscopic device comprising a gyro rotor having a conductive core portion, a rotor bearing frame including a stator having a conductive core portion, said rotor and stator core portions having complementary cylindrical adjacent surfaces defining an air gap therebetween, a pair of motor windings wound on said stator core portion, one of said pair being excited with a fixed alternating current and the other with a variable alternating current whereby the rotating magnetic field generated thereby will drive said rotor through current induced in said rotor core portion at a speed proportional to the magnitude of said variable alternating current, input and output generator windings mounted on said stator contiguously with said motor windings, said input winding being excited with a fixed alternating current and said output winding being arranged on said stator core in relatively angularly spaced relation to said input winding such that at zero rate of rotation of said rotor no signal current will be induced in said output winding, but upon rotation of said rotor a signal current will be induced in said output winding proportional to the rotational velocity of said rotor through currents generated by said input winding in said rotor core portion, said generator and motor windings being relatively arranged on said stator core portion such that currents induced in said generator output winding by currents in said motor windings will cancel whereby no net current will be induced in said generator output winding by the currents in said motor windings.

10. A gyroscopic device comprising a gyro rotor having a conductive core portion, a rotor bearing frame including a stator having a multi-pole conductive core portion, said rotor and stator portions having complementary cylindrical adjacent surfaces defining an air gap therebetween, a pair of motor windings wound in quadrature relation on said stator poles, one winding of said motor pair being excited with a fixed alternating current and the other thereof being excited with a variable alternating current whereby the rotating magnetic field generated thereby will drive said rotor through currents induced in said rotor core portion at a speed proportional to the magnitude of said variable alternating current, input and output generator windings wound on said stator poles contiguously with said motor windings, said input windings being excited with a fixed alternating current and said output windings being arranged on said poles in quadrature relation to said input windings such that at zero rate of rotation of said rotor no signal current will be induced in said output windings but upon rotation of said rotor a signal current will be induced therein proportional to the rotational velocity of said rotor through currents generated by said input winding in said rotor core portion, said generator poles being different in number from said motor poles such that currents induced in the generator output windings by the currents in said motor windings will cancel whereby the signal current in said generator output windings is due solely to the current induced therein by the rotation of said rotor.

References Cited in the file of this patent
UNITED STATES PATENTS

| | | |
|---|---|---|
| 1,030,050 | Bogen | June 18, 1912 |
| 2,181,250 | Reichel | Nov. 28, 1939 |
| 2,555,165 | Turner | May 29, 1951 |
| 2,589,873 | Seifried | Mar. 18, 1952 |
| 2,595,268 | Kellogg | May 6, 1952 |